(12) United States Patent
Wiberg et al.

(10) Patent No.: US 9,294,234 B2
(45) Date of Patent: Mar. 22, 2016

(54) METHODS AND ARRANGEMENTS FOR EARLY HARQ FEEDBACK IN A MOBILE COMMUNICATION SYSTEM

(75) Inventors: Niclas Wiberg, Linköping (SE); Erik Eriksson, Linköping (SE); Pål Frenger, Linköping (SE); Jonas Fröberg Olsson, Ljungsbro (SE); Bo Göransson, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 268 days.

(21) Appl. No.: 13/643,704

(22) PCT Filed: May 4, 2010

(86) PCT No.: PCT/SE2010/050489
§ 371 (c)(1),
(2), (4) Date: Oct. 26, 2012

(87) PCT Pub. No.: WO2011/139191
PCT Pub. Date: Nov. 10, 2011

(65) Prior Publication Data
US 2013/0051272 A1 Feb. 28, 2013

(51) Int. Cl.
*G01R 31/08* (2006.01)
*H04L 5/14* (2006.01)
*H04L 1/18* (2006.01)
*H04L 12/18* (2006.01)

(52) U.S. Cl.
CPC .............. *H04L 1/1829* (2013.01); *H04L 1/189* (2013.01); *H04L 1/1864* (2013.01); *H04L 12/1872* (2013.01); *H04L 12/1877* (2013.01)

(58) Field of Classification Search
CPC .......................... H04L 12/1877; H04L 12/1872
USPC .......................................................... 370/252
See application file for complete search history.

(56) References Cited

U.S. PATENT DOCUMENTS

| | | | |
|---|---|---|---|
| 2007/0079223 A1* | 4/2007 | Mondin | H03M 13/3746 714/780 |
| 2007/0110095 A1 | 5/2007 | Attar et al. | |
| 2009/0086845 A1* | 4/2009 | Demirhan | H04L 1/0003 375/295 |
| 2009/0164862 A1* | 6/2009 | Sagfors | H04L 1/1803 714/748 |
| 2009/0274139 A1 | 11/2009 | Palanki | |
| 2010/0182951 A1* | 7/2010 | Park | H04L 1/0003 370/328 |

FOREIGN PATENT DOCUMENTS

| | | | | |
|---|---|---|---|---|
| EP | 1271894 A1 | 1/2003 | | |
| WO | 0137452 A1 | 5/2001 | | |
| WO | WO 02065734 (A1) | * | 8/2002 | ............ H04L 1/1829 |
| WO | 2006118629 A1 | 11/2006 | | |
| WO | 2008039126 A1 | 4/2008 | | |

* cited by examiner

*Primary Examiner* — Faruk Hamza
*Assistant Examiner* — Abu-Sayeed Haque
(74) *Attorney, Agent, or Firm* — Murphy, Bilak & Homiller, PLLC

(57) ABSTRACT

A receiving node makes an early estimate of the outcome of a decoding attempt and sends a corresponding early feedback (EHF) to the sending node. This has an effect of enabling a fast retransmission of the data by the sending node in case the decoding by the receiving node is likely to fail. An advantage of this is that any delays due to data retransmission may be minimized, resulting in a higher average throughput of the data transmission between the nodes.

10 Claims, 4 Drawing Sheets

METHODS AND ARRANGEMENTS FOR EARLY HARQ FEEDBACK IN A MOBILE COMMUNICATION SYSTEM

TECHNICAL FIELD

The present disclosure relates to a first node and a second node in a mobile communication system and methods therein. In particular, it relates to a method in a first node of controlling transmission of data between the first node and a second node, a method in a second node of controlling transmission of data between the second node and a first node, a first node apparatus configured to control transmission of data between the first node apparatus and a second node apparatus, and a second node apparatus configured to control transmission of data between the second node apparatus and a first node apparatus.

BACKGROUND

Many modern cellular communication systems such as High Speed Packet Access and Long Term Evolution (HSPA and LTE, respectively, in the following), as specified by the 3rd Generation Partnership Project (3GPP in the following) use automatic link adaptation to achieve efficient communication under varying transmission conditions. The effective bit rate is varied quickly (along with related transmission parameters such as code rate and modulation scheme) depending on the predicted radio conditions. When the radio conditions get worse, the bit rate is decreased to reduce the probability of decoding error; when the conditions improves, the bit rate is increased to increase the transmission efficiency without causing a too high error probability. The radio conditions are often predicted based on past measurements of the radio channel.

An often used protocol in these systems is Hybrid Automatic Repeat Request, in the following referred to as HARQ. With HARQ, failure to decode a received transport block results in a retransmission, possibly with a different redundancy version.

When a receiver fails in its attempt to decode a transport block, it typically stores the received signal or a processed version of the signal, and combines it with a later received signal for a retransmission of that block. This is known as soft combining, variants of which include Chase combining and incremental redundancy. Soft combining greatly increases the probability of a correct decoding.

In many HARQ protocols, the receiver sends a HARQ feedback after each decoding attempt, in the form of a positive or negative acknowledgement (in the following referred to as ACK and NACK, respectively) to indicate if the particular transport block was correctly decoded or not. In case a NACK is sent, the transmitter typically retransmits the transport block. In the case of ACK, the transmitter may instead use its resources to transmit new data, to the same or a different receiving entity.

Another way of using the HARQ protocol is to let the receiving entity control the transmissions, as is done on the LTE uplink where the receiving entity is a NodeB unit and the transmitting entity is a user equipment (UE in the following). The receiving entity sends a grant for each requested transmission, indicating among other things the transport format (i.e. modulation and code rate) and whether a retransmission or an original transmission is requested. A grant for a retransmission may in some cases consist of a single bit, similar to a HARQ ACK/NACK, but a retransmission may in other cases be a complete grant of the same size as a grant for an original transmission. With this view, transmission grants may be seen as a kind of HARQ feedback.

In both HARQ variants, the receiving entity must perform a complete decoding attempt before it can decide upon its next action. However, modern error-correcting codes, such as Turbo codes, are very complex to decode, resulting in long delays from transmission until a message can be sent back to the transmitting entity. This results in long round-trip delays of the HARQ retransmissions. For example, in LTE the minimum round-trip delay is 8 ms.

HARQ with soft combining may be viewed as a kind of (implicit) link adaptation mechanism. This is the case if the bit rate is chosen so high that one or more retransmissions are often needed. The effective bit rate of an entire transmission of a transport block then depends on the total number of transmissions, including original transmissions and retransmissions, as well as transport format parameters such as modulation and code rate. Contrary to link adaptation based on past measurements of radio conditions, the effective bit rate of such a HARQ transmission is determined by the radio conditions during the actual transmission of the transport block.

Because of the nature of radio channels, and the behavior of interference from other transmitters, it is difficult to make an accurate prediction of the radio conditions for a particular transmission. This has made it necessary, in the prior art, to apply a significant margin against sudden variations, in order to keep the probability of decoding error acceptably low. Such a margin reduces the average throughput.

A higher average throughput may theoretically be achieved by using a higher original transmission bit rate and accepting a higher error probability. However, an acceptance of a higher error probability also implies an acceptance of a larger number of retransmissions in the HARQ procedure. A drawback with such an approach is that it results in much longer packet delays, since each retransmission adds at least 8 ms to the total transmission time of the packet, in case of an LTE system.

SUMMARY

It is an object to obviate at least some of the above drawbacks by reducing delays in data transmission between nodes in a mobile communication system and thereby improve the average throughput in the system.

Hence, in a first aspect there is provided a method in a first node of controlling transmission of data between the first node and a second node in a mobile communication system. The method comprises receiving, from the second node, a message comprising coded data. The method further comprises calculating an estimate of a probability of a successful decoding of the coded data and sending, to the second node, a probability feedback message comprising an indicator representing the calculated estimate.

In other words, a method is provided in a receiving node that makes an early estimate of the outcome of a decoding attempt and sends a corresponding early feedback to the sending node. This has an effect of enabling a fast retransmission of the data by the sending node in case the decoding by the receiving node is likely to fail. An advantage of this is that any delays due to data retransmission may be minimized, resulting in a higher average throughput of the data transmission between the nodes.

The calculation of an estimate of a probability of a successful decoding of the coded data may comprise performing a partial decoding of the coded data.

The calculation of an estimate of a probability of a successful decoding of the coded data may comprise analyzing a quality of a radio channel through which the coded data is received.

In other words, the probability of a successful decoding may be estimated in any desired way. A partial decoding may be done using a minimum of calculation resources and in cases where information is available regarding a radio channel quality even less resources are needed. This is advantageous at least in that it provides flexibility when implementing the method in various systems.

The indicator representing the calculated estimate may be a binary indicator, the levels of which represent a high probability and a low probability, respectively, of a successful decoding of the coded data.

In other words, by using a binary indicator with its inherent compact character, it is possible to even further reduce any delays with the associated advantage of enabling high average throughput of the data transmission between the nodes.

The sending of the probability feedback message may be performed conditionally such that the message is sent only when the binary indicator is at one specific level.

In other words, by sending the feedback message in cases where it indicates a low probability and refrain from sending the it in cases where it indicates a high probability, or vice versa, it is possible to even further reduce any delays, which is advantageous as it enables higher average throughput of the data transmission between the nodes.

The indicator may be set to indicate a probability of zero of a successful decoding of the coded data in a case where the quality of the radio channel is below a first quality threshold, and the indicator may be set to indicate a probability of one of a successful decoding of the coded data in a case where the quality of the radio channel is above a second quality threshold.

That is, in certain cases where there is no question regarding the quality of the channel through which the transmissions take place, there is no point in making any calculations in order to make the estimate of the probability of a successful decoding. Rather, if the channel conditions are such that they are below a threshold value, for example as defined by a first predetermined signal to interference and noise (SINR) value, the indicator is set to indicate a low probability of a successful decoding. Conversely, if the channel conditions are such that they are above a threshold value, for example as defined by a second predetermined signal to interference and noise (SINR) value, the indicator is set to indicate a high probability of a successful decoding.

The calculation of an estimate of a probability of a successful decoding of the coded data may be performed prior to decoding the coded data and the sending of the probability feedback message may be performed prior to sending an acknowledgement, ACK, or a negative acknowledgement, NACK, response in a hybrid automatic request for retransmission, HARQ, procedure involving the first node and the second node.

Alternatively, the sending of the probability feedback message is performed instead of sending an acknowledgement, ACK, or a negative acknowledgement, NACK, response in a hybrid automatic request for retransmission, HARQ, procedure involving the first node and the second node.

In other words, an implementation in a system that operates as specified in a standard that involves a Hybrid Automatic Repeat Request procedure, such as 3GPP LTE, may be such that the estimated probability is fed back to the sending node before, or instead of, any HARQ ACK/NACK message is fed back. It is hence possible to reduce any delays with the associated advantage of enabling high average throughput of the data transmission between the nodes in a 3GPP LTE system.

In a second aspect there is provided a method in a second node of controlling transmission of data between the second node and a first node in a mobile communication system. The method of the second aspect comprises sending, to the first node, a message comprising coded data. The method further comprises receiving, from the first node, a probability feedback message comprising an indicator representing an estimate of a probability of a successful decoding of the coded data. The received indicator is analyzed and, depending on the received indicator, the coded data is re-sent to the first node.

In other words, according to the second aspect, a corresponding method is provided in a sending node that makes use of an early estimate, made by the receiving node, of the outcome of a decoding attempt to enable a fast retransmission of the data in case the decoding by the receiving entity is likely to fail. An advantage of this is that any delays due to data retransmission may be minimized, resulting in a higher average throughput of the data transmission between the nodes.

In a third aspect there is provided a first node apparatus configured to control transmission of data between the first node apparatus and a second node apparatus in a mobile communication system. The first node apparatus comprises control and communication circuitry comprising receiving circuitry configured to receive, from the second node apparatus, a message comprising coded data. The circuitry further comprises processing circuitry configured to calculate an estimate of a probability of a successful decoding of the coded data, and sending circuitry configured to send, to the second node apparatus, a probability feedback message comprising an indicator representing the calculated estimate.

In a fourth aspect there is provided a second node apparatus configured to control transmission of data between the second node apparatus and a first node apparatus in a mobile communication system. The second node apparatus comprises control and communication circuitry comprising sending circuitry configured to send, to the first node apparatus, a message comprising coded data and receiving circuitry configured to receive, from the first node apparatus, a probability feedback message comprising an indicator representing an estimate of a probability of a successful decoding of the coded data. The circuitry further comprises processing circuitry configured to analyze the received indicator, and depending on the received indicator, control the sending circuitry to re-send the coded data to the first node apparatus.

With respect to the third and fourth aspects, embodiments, effects and advantages correspond to those described above in connection with the first and second aspects.

DETAILED DESCRIPTION OF EMBODIMENTS

Figure 1:
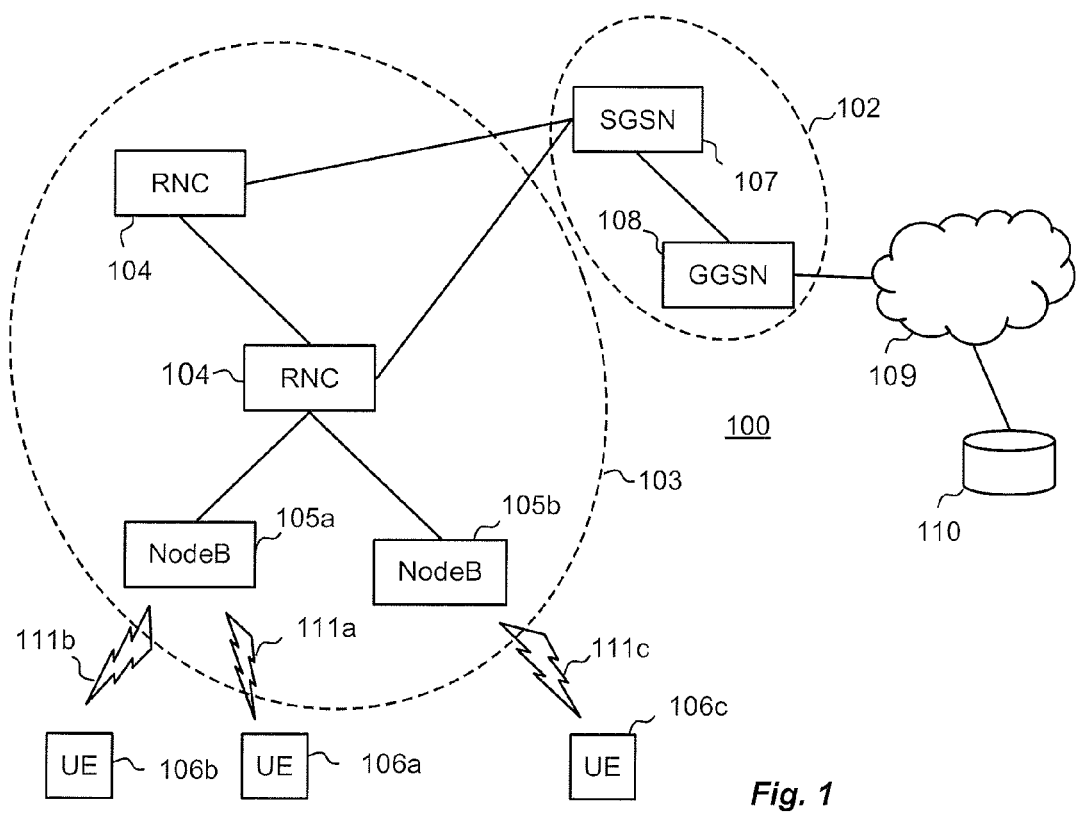
FIG. 1 illustrates schematically a mobile communication system.

FIG. 1 illustrates schematically a universal mobile telecommunications system (UMTS) network 100 in which the above summarized methods and apparatuses may be implemented. It should be noted, however, that the skilled person will readily be able to perform implementations in other similar communication systems involving transmission of coded data between nodes.

In FIG. 1 the UMTS network 100 comprises a core network 102 and a UMTS terrestrial radio access network (UTRAN) 103. The UTRAN 103 comprises a number of nodes in the form of radio network controllers (RNC) 104, each of which is coupled to a set of neighboring nodes in the form of base transceiver stations (BTS) 105. BTS's are sometimes referred to as Node B's. Each Node B 105 is responsible for a given geographical cell and the controlling RNC 104 is responsible for routing user and signaling data between that Node B 105 and the core network 102. All of the RNC's 104 are coupled to one another. A general outline of the UTRAN 103 is given in "Technical Specification TS 25.401 V3.2.0 of the 3rd Generation Partnership Project".

FIG. 1 also illustrates nodes in the form of mobile devices or user equipment (UE) 106a-c connected to a respective Node B 105a-b in the UTRAN 103 via a respective air interface 111a-c, a serving GPRS support node (SGSN) 107 and a GPRS gateway support node (GGSN) 108. Mobile devices served by one Node B, such as devices 106a and 106b served by Node B 105a, are located in a so-called radio cell. The SGSN 107 and the GGSN 108 in the core network 102 provide packet switched data services to the UE 106 via the UTRAN 103, with the GGSN 108 being coupled to the Internet 109 where, schematically, a server 110 illustrates an entity with which the mobile devices 106 may communicate. As the skilled person realizes, the network 100 in FIG. 1 may comprise a large number of similar functional units in the core network 102 and the UTRAN 103, and in typical realizations of networks, the number of mobile devices may be very large.

Furthermore, as will be discussed in detail in the following, communication between the nodes in the UTRAN 103 and the mobile devices 106 may follow the protocols as specified by 3GPP LTE specifications. In particular, communication involving Hybrid Automatic Repeat Request (HARQ) will be discussed. Specifications relating to HARQ include release 8 of 3GPP TS 36.211, 3GPP TS 36.212 and 3GPP TS 36.213.

Figure 2:
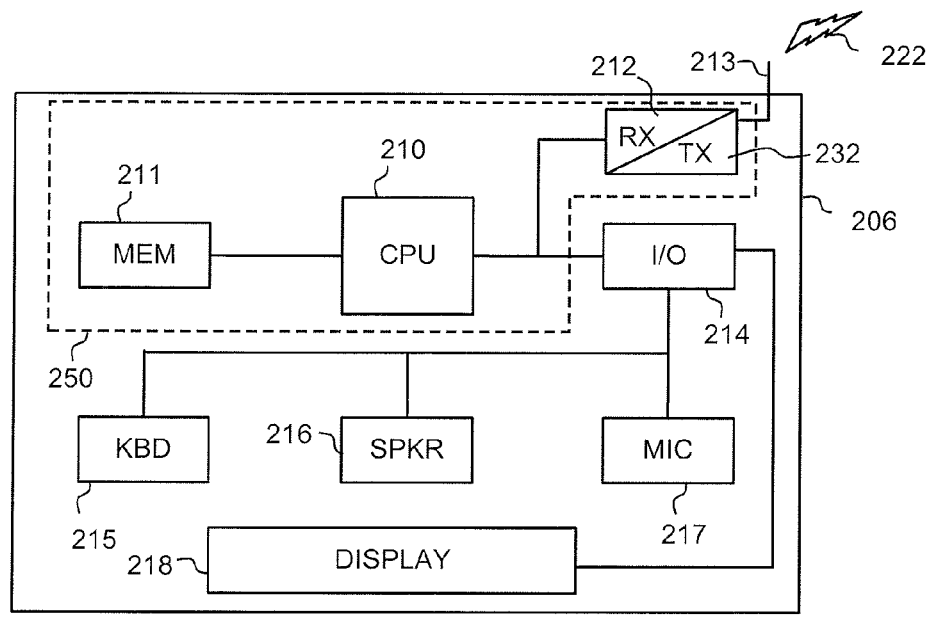
FIG. 2 illustrates schematically a mobile communication terminal.

FIG. 2 illustrates schematically a node 206 in the form of a mobile communication device or user equipment (UE), corresponding to any of the communication devices 106 in FIG. 1. The communication device 206, which is shown in some more detail as compared to the description of the device 106 in FIG. 1, comprises a processor 210 and a memory 211. Input/output units in the form of a microphone 217, a speaker 216, a display 218 and a keypad 215 are connected to the processor 210 and memory 211 via an input/output interface unit 214. Radio communication via an air interface 222 is realized by radio receiving circuitry 212, radio sending circuitry 232 and an antenna 213. The processor 210 makes use of software instructions stored in the memory 211 in order to control functions of the terminal 206, including the functions to be described in detail below with regard to the feedback messages. In other words, at least the radio circuitry 212, 232, the processor 210 and the memory 211 form parts of an apparatus 250 that is configured to control transmission of data as summarized above and described in detail below. Further details regarding how these units operate in order to perform normal functions within a UMTS/LTE network, such as the network 100 of FIG. 1, are known to the skilled person and are therefore not discussed further.

Figure 3:
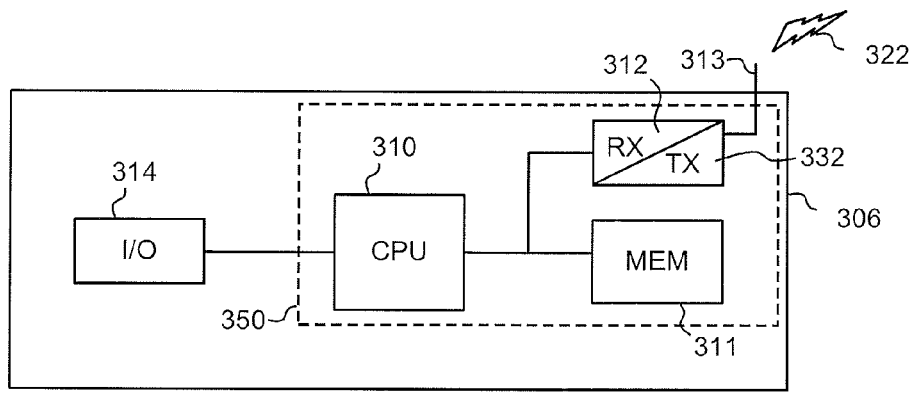
FIG. 3 illustrates schematically a NodeB.

FIG. 3 illustrates schematically a node 306 in the form of a NodeB, corresponding to any of the nodes 105 in FIG. 1. Similar to the node described above in connection with FIG. 2, the NodeB in FIG. 3 is shown in some more detail as compared to the description of the nodes 105 in FIG. 1. The node 306 comprises a processor 310, a memory 311, radio receiving circuitry 312, radio sending circuitry 332 and an antenna 313. Radio communication via an air interface 322 is realized by the radio circuitry 312, 332 controlled by the processor 310. An input/output interface unit 314 connects the node 306 with other nodes in a core network, such as the core network 102 in the network 100 in FIG. 1. The processor 310 makes use of software instructions stored in the memory 311 in order to control functions of the node 306, including the functions to be described in detail below with regard to the feedback messages. In other words, at least the radio circuitry 312, 332, the processor 310 and the memory 311 form parts of an apparatus 350 that is configured to control transmission of data as summarized above and described in detail below. Further details regarding how these units operate in order to perform normal functions within a UMTS/LTE network, such as the network 100 of FIG. 1, are known to the skilled person and are therefore not discussed further.

As indicated, the above described node 206, in the form of a mobile communication device or user equipment (UE), may be considered as a first node apparatus and the node 306, in the form of a NodeB, may be considered as a second node apparatus. Conversely, the node 306 may be considered as a first node apparatus and the node 206 may be considered as a second node apparatus, as will be exemplified in the following.

With respect to the first node apparatus 206, 306, it is configured to control transmission of data between the first node apparatus 206, 306 and the second node apparatus 206, 306 in a mobile communication system (reference number 100 in FIG. 1). As mentioned, the first node apparatus 206, 306 comprises control and communication circuitry 250, 350 comprising receiving circuitry 212, 312 configured to receive, from the second node apparatus 206, 306, a message comprising coded data. The processing circuitry 210, 310 of the control and communication circuitry 250, 350 is further configured to calculate an estimate of a probability of a successful decoding of the coded data, and the sending circuitry 232, 332 is configured to send, to the second node apparatus 206, 306, a probability feedback message comprising an indicator representing the calculated estimate.

The processing circuitry 210, 310 configured to calculate an estimate of a probability of a successful decoding of the coded data may be configured to perform a partial decoding of the coded data and/or configured to analyze a quality of a radio channel (reference 111, 222, 322 in FIGS. 1, 2 and 3, respectively) through which the coded data is received.

Furthermore, the processing circuitry 210, 310 may be configured such that the indicator representing the calculated estimate is a binary indicator, the levels of which represent a high probability and a low probability, respectively, of a successful decoding of the coded data. In such cases, the sending circuitry 232, 332 configured to send the probability feedback message may be configured to send the probability feedback message conditionally such that the message is sent only when the binary indicator is at one specific level. The processing circuitry 210, 310 may be configured such that the indicator is set to indicate a probability of zero of a successful decoding of the coded data in a case where the quality of the radio channel 111, 222, 322 is below a first quality threshold, and set to indicate a probability of one of a successful decoding of the coded data in a case where the quality of the radio channel is above a second quality threshold.

Moreover, the processing circuitry 210, 310 configured to calculate an estimate of a probability of a successful decoding of the coded data may be configured to calculate the estimate prior to decoding the coded data and configured to control the sending circuitry 232, 332 to send the probability feedback message prior to sending an acknowledgement, ACK, or a negative acknowledgement, NACK, response in a hybrid automatic request for retransmission, HARQ, procedure involving the first node apparatus 206, 306 and the second node apparatus 206, 306. Alternatively, the sending circuitry 232, 332 configured to send the probability feedback message may be configured to send the probability feedback message instead of sending an acknowledgement, ACK, or a negative acknowledgement, NACK, response in a hybrid automatic request for retransmission, HARQ, procedure involving the first node apparatus 206, 306 and the second node apparatus 206, 306.

With respect to the second node apparatus 206, 306, it is configured to control transmission of data between the second node apparatus 206, 306 and the first node apparatus 206, 306 in the mobile communication system 100. As mentioned, the second node apparatus 206, 306 comprises control and communication circuitry 250, 350 sending circuitry 232, 332 configured to send, to the first node apparatus 206, 306, a message comprising coded data. The receiving circuitry 212, 312 is further configured to receive, from the first node apparatus 206, 306, a probability feedback message comprising an indicator representing an estimate of a probability of a successful decoding of the coded data. The processing circuitry 210, 310 is also configured to analyze the received indicator and, depending on the received indicator, control the sending circuitry 232, 332 to re-send the coded data to the first node apparatus 206, 306.

The receiving circuitry 212, 312 configured to receive the probability feedback message may be configured to receive the probability feedback message prior to receiving an acknowledgement, ACK, or a negative acknowledgement, NACK, response in a hybrid automatic request for retransmission, HARQ, procedure involving the first node apparatus 206, 306 and the second node apparatus 206, 306.

Alternatively, the sending circuitry 232, 332 configured to send coded data may be configured to send coded data by repeatedly sending a plurality of messages during a plurality of consecutive transmission time intervals, and configured to discontinue the repetitive sending in case the received indicator indicates a high probability of a successful decoding of the coded data.

Figure 4A:
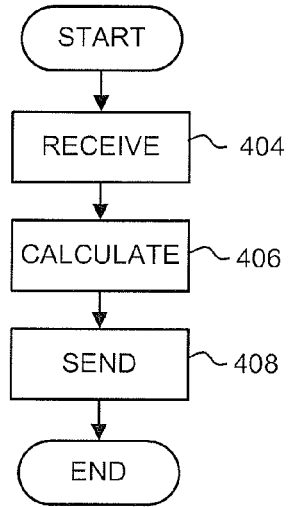
FIG. 4a is a flow chart of a signaling method.
Figure 4B:
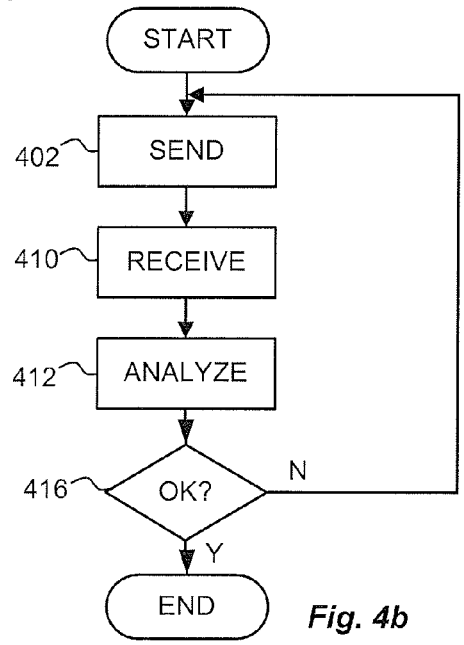
FIG. 4b is a flow chart of a signaling method.
Figure 4C:
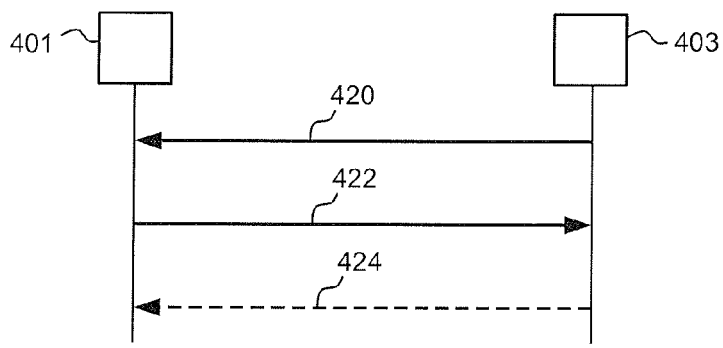
FIG. 4c is a signaling diagram of the methods in FIGS. 4a and 4b.
Figure 5:
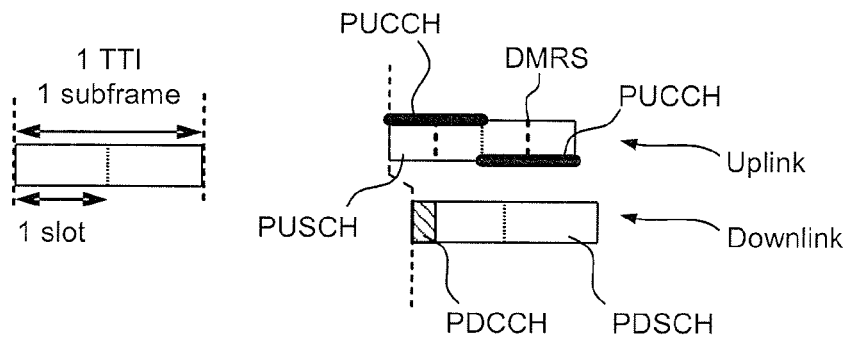
FIG. 5 is an explanatory timing diagram.

Turning now to FIGS. 4a, 4b and 4c, signaling between nodes in a network, such as the network 100 in FIG. 1, will be described. The nodes involved are, for example, the mobile communication devices 106 and the NodeB's 105. As will be evident from the description to follow, all nodes involved in the signaling are nodes that perform both sending and receiving and hence comprise sending as well as receiving circuitry.

FIG. 4a illustrates steps performed in a first node 401, for example a mobile communication device such as the device 206 in FIG. 2 described above, in a situation where data messages are sent from a second node 403, e.g. a NodeB such as the NodeB 306 in FIG. 3 described above, on a downlink connection. FIG. 4b illustrates steps performed in the second node 403 during the data message communication. FIG. 4c is a signaling diagram illustrating the signals involved during the execution of the steps illustrated in FIG. 4a and FIG. 4b.

The method performed in the first node 401 involves controlling transmission of data between the first node 401 and a second node 403 and comprises, in a receive step 404, receiving a message 420 comprising coded data from the second node 403. An estimate of a probability of a successful decoding of the coded data is calculated in a calculation step 406, and a probability feedback message 422 comprising an indicator representing the calculated estimate is sent to the second node 403 in a send step 408.

The method performed in the second node 403 involves controlling transmission of data between the second node and the first node 401 and comprises, in a send step 402, sending to the first node 401 the message 420 comprising coded data. In a receive step 410, the probability feedback message 422 comprising an indicator representing an estimate of a probability of a successful decoding of the coded data is received from the first node 401. The received indicator is then analyzed in an analyze step 412 and, depending on the received indicator, as decided in a decision step 416, the coded data may be re-sent to the first node 401 in the send step 402.

Now, in some more detail, signalling between two nodes will be described in terms of examples within the framework of the 3GPP standard relating to HARQ. References will be made also to FIGS. 5 to 10. As mentioned above, relevant standard references are 3GPP TS 36.211, 3GPP TS 36.212 and 3GPP TS 36.213. The nodes involved may be any of the nodes and methods already illustrated in FIGS. 1 to 4. The procedures to be described are to be interpreted only as specific examples of the signaling procedures described in more general terms above.

Following the terminology of the standard specifications, a number of abbreviations will be used in the description and drawings, in addition to those already introduced. These abbreviations are:
 BLER Block Error Rate
 CSI Channel State Information
 DL-SCH Downlink Shared Channel
 DMRS Demodulation Reference Symbols
 MCS Modulation and Coding Scheme
 PDCCH Physical Downlink Control Channel
 PDSCH Physical Downlink Shared Channel
 PHICH Physical Hybrid ARQ Indicator Channel
 PUCCH Physical Uplink Control Channel
 PUSCH Physical Uplink Shared Channel
 RLC Radio Link Control
 RTX Retransmission
 SINR Signal-to-Interference-and-Noise Ratio
 T-CSI Transmission-dependent Channel State Information
 TTI Transmission Time Interval
 TX Transmission
 UL-SCH Uplink Shared Channel An abbreviation EHF, Early HARQ Feedback, is introduced here as a denominator for a message and is an example of the probability feedback message used above and in the claims.

FIGS. 6-10 are timing diagrams that illustrate signalling between nodes on uplink and downlink connections. In order to increase readability of the figures, these have not been cluttered with reference numerals. Instead, FIG. 5 has been included for the purpose of explaining the different symbols used in FIGS. 6-10.

The EHF may be added to the LTE DL-SCH. That is, in 3GPP Release 8, the HARQ ACK/NACK for a DL-SCH transmission in subframe k is transmitted in subframe k+4 (sometimes later in the case of TDD), either on the PUCCH or on the PUSCH. The example described here is to add a new control message, EHF, in addition to the already present HARQ ACK/NACK. The EHF is transmitted at a defined earlier time instant, for example in subframe k, k+1, k+2, or k+3.

The EHF is either positive or negative, positive meaning that the decoding is likely to succeed, and negative that the decoding is likely to fail. The EHF may be allowed to be sometimes "incorrect", i.e. not matching the actual decoding outcome and the real HARQ ACK/NACK. The EHF may be required (by 3GPP compliance test cases) to be correct in clear-cut cases: when the channel quality is much too low for a particular transmission, the EHF may be required to be negative, and when the channel quality is far above the level needed the EHF may be required to be positive.

The EHF may be implemented such that a signal is only transmitted for a positive EHF while a negative EHF is indicated with absence of a signal, or vice versa.

The UE may generate the EHF in an implementation-dependant way, for instance by comparing a SINR estimate with a required SINR, or by performing a partial decoding attempt. The required SINR may be calculated from transmission parameters received on the PDCCH, using knowledge about the UE receiver performance and possibly adding an error margin. The SINR estimate may be generated by standard techniques using e.g. measurements of channel impulse response, received signal power, and received interference power.

On the base station (NodeB) side, a received negative EHF may lead to an immediate retransmission of the corresponding transport block. The base station may decide to postpone the retransmission e.g. if there are higher-priority transmissions to be made first. A positive EHF would mean that no immediate retransmission takes place, but if a negative HARQ ACK/NACK is later received for the same transport block, a retransmission is performed at a later time.

Figure 6:
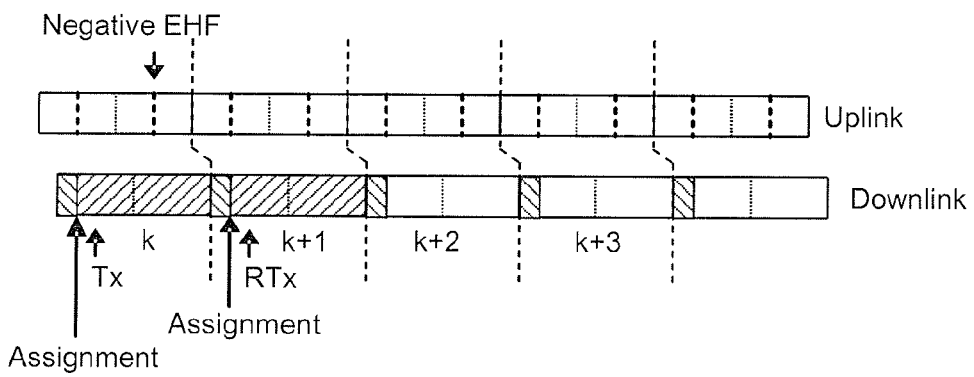
FIG. 6 is a timing diagram of feedback for a downlink transmission.

FIG. 6 illustrates a case when the EHF is sent in the same subframe as the transmission. The original transmission, Tx, occurs in subframe k, a negative EHF transmitted in subframe k, and a corresponding retransmission, RTx, in subframe k+1.

Figure 7:
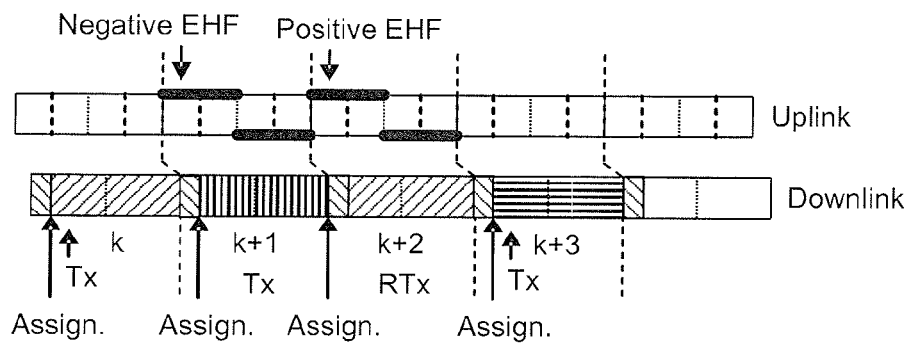
FIG. 7 is a timing diagram of feedback for a downlink transmission.

FIG. 7 illustrates a case when the EHF is sent in the subframe after the transmission. Two original transmissions, Tx, occur in subframe k and k+1. A negative EHF for subframe k is transmitted in subframe k+1, resulting in a retransmission, RTx, in subframe k+2.

The EHF may be added to the LTE DL-SCH. That is, in 3GPP Release 8, the HARQ ACK/NACK for UL-SCH transmission in subframe k, originating from a grant or HARQ feedback in subframe k−4, is transmitted in subframe k+4 (sometimes later in the case of TDD), on PHICH. Synchronous HARQ is employed on UL-SCH and in case of a received NACK on PHICH, a retransmission is triggered in subframe k+8. The example described here is to add the new control message, EHF, in addition to or instead of the already present HARQ ACK/NACK. The EHF is transmitted at a defined earlier time instant, for example in subframe k, k+1, k+2, or k+3.

The negative EHF may represent that a retransmission should be sent at the next available opportunity. A positive EHF would instead mean that new data should be transmitted in already scheduled subframes.

Figure 8:
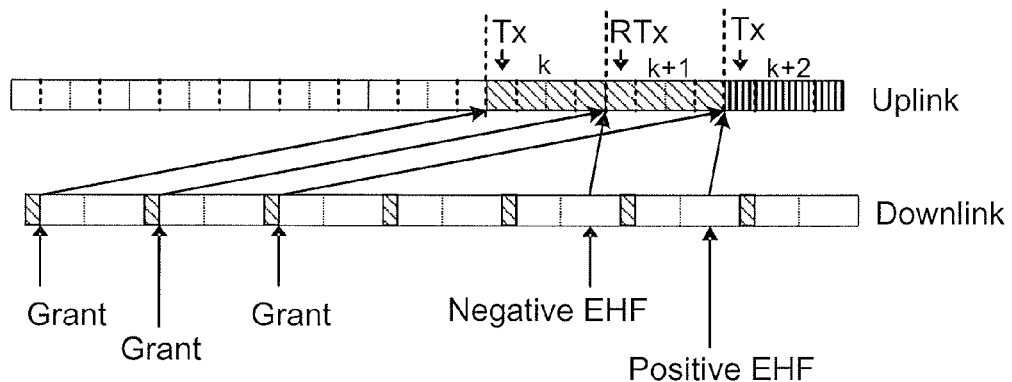
FIG. 8 is a timing diagram of feedback for an uplink transmission.

FIG. 8 illustrates a case where scheduling grants have been sent for original transmissions, Tx, in subframes k, k+1, and k+2. A negative EHF for subframe k is sent in subframe k, resulting in a retransmission, RTx, in subframe k+1, overriding the grant for an original transmission in that subframe.

Figure 9:
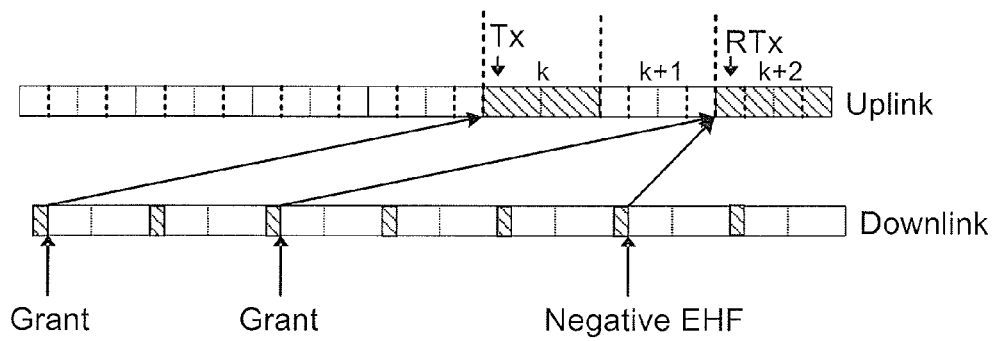
FIG. 9 is a timing diagram of feedback for an uplink transmission.
Figure 10:
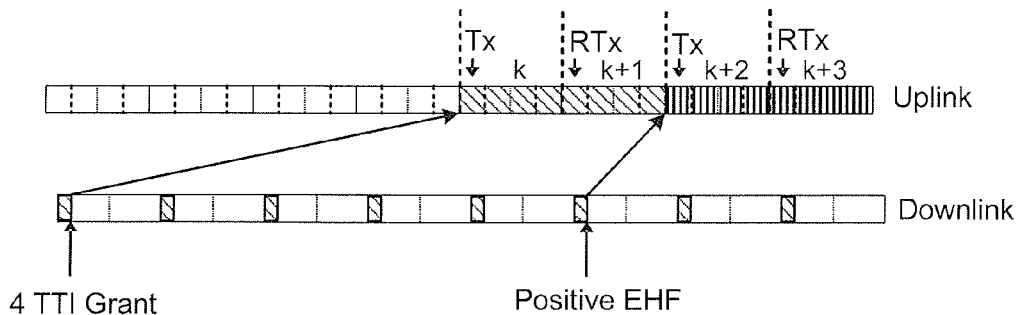
FIG. 10 is a timing diagram of feedback for an uplink transmission.

FIG. 9 is a similar example, where the EHF for a transmission, Tx, in subframe k is transmitted in subframe k+1, and the retransmission, RTx, occurs in subframe k+2.

One use of the uplink EHF may be in case of TTI bundling. With TTI bundling an UE is assigned multiple subframes (e.g. four subframes k, k+1, k+2 and k+3) for transmissions, Tx, in one grant, where the UE does autonomous retransmissions, RTx, in the extra subframes. This may be used with EHF in the following way. The base station may detect channel quality, and if it estimates that decoding will be possible it transmits a positive EHF. The positive EHF would in this example cause the UE to send new data instead of retransmitting the initial transmission in subsequent subframes. An example of this is described in FIG. 10.

Use of the EHF in uplink as well as in the downlink will provide reduced, i.e. shorter, delays. That is, the EHF provides shorter retransmission round-trip times. This may be used to an advantage in different ways, depending on the inherent tradeoff between retransmission rate and HARQ efficiency. Firstly, if keeping the retransmission rate fixed, the introduction of EHF provides shorter packet transmission latencies. Secondly, if allowing the retransmission rate to increase, the introduction of EHF provides higher transmission efficiency without increasing the packet transmission latency. Thirdly, other tradeoffs may be achieved, e.g. a lesser decrease in latency combined with a lesser increase in the efficiency.

The EHF may be defined for different granularities. For instance, in the LTE downlink, multiple transport blocks may be sent in the same subframe, using spatial multiplexing. In such cases multiple HARQ ACK/NACK flags are sent to indicate the decoding outcome for each transport block individually.

The EHF may be defined in a similar way to provide individual feedback per transport block. Alternatively, it may be defined to provide a single feedback per transmission, regardless of the number of transport blocks.

When the EHF is used it may not be necessary to use the normal HARQ ACK/NACK, i.e. the EHF may replace the HARQ ACK/NACK altogether. Nevertheless, it may still be necessary to have additional feedback mechanism, in case the EHF is incorrect or incorrectly received. Such an additional feedback may be provided by an additional protocol layer such as the RLC sublayer operating in acknowledged mode, or alternatively by a feedback mechanism operating within the HARQ retransmission protocol.

Since not all transmissions require an additional feedback message from the receiver it might be beneficial to combine the EHF with a selective repeat (SR) HARQ feedback protocol. The selective repeat HARQ feedback protocol could for instance be based on timing or HARQ identity signalling. Alternatively, the more reliable feedback scheme could be more detailed, e.g. it could indicate which code-block that failed.

The use of EHF may be beneficial in combination with multi-hop techniques. For high rate multi-hop communication the end-to-end delay becomes an issue. This is an area where EHF may provide large benefits.

For example, EHF may be combined with Relaying ARQ where an ACK from a relay to the transmitter denotes that the responsibility for forwarding the packet to the receiver is now taken over by the relay node. An example of such Relaying ARQ is to be found in the international patent application publication WO2006/024320. As soon as the transmitter receives an ACK from the relay it may delete the packet from the transmission buffer, i.e. the transmitter does not have to wait for the ACK from the final receiver. An ACK from an intermediate relay is sufficient.

The EHF feeds back a measure of how likely it is that the receiving node will be able to correctly decode the corresponding transmission. Another viewpoint of the feedback is to view it as a measure of the channel state for a particular transmission. Such information regarding a channel state is the fast and Transmission-dependent Channel State Information (T-CSI), as specified for example in 3GPP TS 36.213. Such feedback may be used by the transmitting node to calculate how likely the receiver will be able to correctly decode the transmission and as additional information for the link adaptation mechanism.

Hence, one option is to add a new control message, T-CSI, in addition to already present CSI reporting messages. The T-CSI message is transmitted as a result of a DL-SCH transmission. If the DL-SCH transmission occurs in sub-frame k the T-CSI message would be sent shortly after CSI information for sub-frame k could be extracted, for instance in sub-frame k, k+1, k+2, or k+3.

The T-CSI may in such an example represent information on the difference between the channel quality on the part of the channel the UE transmitted on and the MCS (Modulation and Coding Scheme) used. The MCS value is here assumed to be integer valued such that lower MCS value means more robust format. With, for example, one bit information allocated for the T-CSI message a value "0" could mean that the channel for the DL-SCH transmission would have required X steps lower MCS value to reach an expected Y % BLER, where X and Y are some configurable values. Otherwise, a value "1" for the T-CSI is transmitted.

As discussed, the EHF provides a fast feedback to the transmitting node. However, if the transmitter can send a retransmission soon after receiving the EHF, even lower round-trip times may be obtained. An aspect to bear in mind in such a case is that it takes some time to prepare a transmission. For instance, when generating a new transmission it may be necessary to fetch the contained data from a memory, format the data properly and add protocol headers, encode it, and modulate it. To save time, the transmitter may prepare such a new transmission before knowing whether a positive or negative EHF for an earlier transmission will be received. If a positive EHF is received, the prepared new transmission is sent. If a negative EHF is received, an already prepared retransmission is sent instead. The prepared new transmission may then be discarded, or perhaps saved for a later transmission opportunity.

The EHF may be generated in a predictive way, i.e. speculating whether a signal received in the future will be possible to decode or not. Such a prediction may be based on current or recent estimates of channel quality and interference situation. The time horizon of the prediction may be set to match the round-trip time of the retransmission protocol, such that a negative EHF that predicts that a future received signal will not be possible to decode results in a continued or additional transmission of a signal immediately following the first signal.

In summary, using an early feedback as described above provides advantages over prior art solutions. For example, by avoiding waiting for the decoding outcome before sending the HARQ feedback, the time from an incorrectly received transport block to the corresponding retransmission is reduced. Used with equal retransmission rates, this provides shorter packet transmission latencies. Used with increased retransmission rates, this instead provides higher transmission efficiency with the same packet latency.

The invention claimed is:

1. A method in a first node of controlling transmission of data between the first node and a second node in a mobile communication system, the method comprising:
   receiving, from the second node, a message comprising coded data;
   calculating an estimate of a probability of a successful decoding of the coded data; and
   sending, to the second node, a probability feedback message comprising an indicator representing the calculated estimate, wherein:
   the calculation of an estimate of a probability of a successful decoding of the coded data is performed prior to decoding the coded data and the sending of the probability feedback message is performed prior to sending an acknowledgement (ACK) or a negative acknowledgement (NACK) response for the coded data in a hybrid automatic request for retransmission (HARQ) procedure involving the first node and the second node.

2. The method of claim 1, wherein the calculation of an estimate of a probability of a successful decoding of the coded data comprises performing a partial decoding of the coded data.

3. The method of claim 1, wherein the calculation of an estimate of a probability of a successful decoding of the coded data comprises analyzing a quality of a radio channel through which the coded data is received.

4. The method of claim 1, wherein the indicator representing the calculated estimate is a binary indicator, the levels of which represent a high probability and a low probability, respectively, of a successful decoding of the coded data.

5. The method of claim 4, wherein the sending of the probability feedback message is performed conditionally such that the message is sent only when the binary indicator is at one specific level.

6. The method of claim 4, wherein:
   the calculation of an estimate of a probability of a successful decoding of the coded data comprises analyzing a quality of a radio channel through which the coded data is received; and
   the indicator is set to indicate a probability of zero of a successful decoding of the coded data in a case where the quality of the radio channel is below a first quality threshold; and
   the indicator is set to indicate a probability of one of a successful decoding of the coded data in a case where the quality of the radio channel is above a second quality threshold.

7. A method in a second node of controlling transmission of data between the second node and a first node in a mobile communication system, the method comprising:
   sending, to the first node, a message comprising coded data;
   receiving, from the first node, a probability feedback message comprising an indicator representing an estimate of a probability of a successful decoding of the coded data;
   analyzing the received indicator; and
   depending on the received indicator, re-sending the coded data to the first node, wherein:
   the reception of the probability feedback message is performed prior to reception of an acknowledgement (ACK) or a negative acknowledgement (NACK)

response for the coded data in a hybrid automatic request for retransmission (HARQ) procedure involving the first node and the second node.

8. The method of claim 7, wherein the sending of coded data is performed by repeatedly sending a plurality of messages during a plurality of consecutive transmission time intervals, the method further comprising discontinuing the repetitive sending in case the received indicator indicates a high probability of a successful decoding of the coded data.

9. A first node apparatus configured to control transmission of data between the first node apparatus and a second node apparatus in a mobile communication system, the first node apparatus comprising control and communication circuitry comprising:
   receiving circuitry configured to receive, from the second node apparatus, a message comprising coded data;
   processing circuitry configured to calculate an estimate of a probability of a successful decoding of the coded data; and
   sending circuitry configured to send, to the second node apparatus, a probability feedback message comprising an indicator representing the calculated estimate, wherein:
   the processing circuitry is configured such that the calculation of the estimate of a probability of a successful decoding of the coded data is performed prior to decoding the coded data and the sending circuitry is configured such that the sending of the probability feedback message is performed prior to sending an acknowledgement (ACK) or a negative acknowledgement (NACK) response for the coded data in a hybrid automatic request for retransmission (HARQ) procedure involving the first node and the second node.

10. A second node apparatus configured to control transmission of data between the second node apparatus and a first node apparatus in a mobile communication system, the second node apparatus comprising control and communication circuitry comprising:
   sending circuitry configured to send, to the first node apparatus, a message comprising coded data;
   receiving circuitry configured to receive, from the first node apparatus, a probability feedback message comprising an indicator representing an estimate of a probability of a successful decoding of the coded data;
   processing circuitry configured to analyze the received indicator, and depending on the received indicator, control the sending circuitry to re-send the coded data to the first node apparatus, wherein:
   the receiving circuitry is configured such that the reception of the probability feedback message is performed prior to reception of an acknowledgement (ACK) or a negative acknowledgement (NACK) response for the coded data in a hybrid automatic request for retransmission (HARQ) procedure involving the first node and the second node.

* * * * *